US010817941B2

(12) United States Patent
Byron et al.

(10) Patent No.: US 10,817,941 B2
(45) Date of Patent: *Oct. 27, 2020

(54) MODELING ASSET TRANSFER FLOW RELATIONSHIPS DISCOVERED IN UNSTRUCTURED DATA

(71) Applicant: International Business Machines Corporation, Armonk, NY (US)

(72) Inventors: Donna K. Byron, Petersham, MA (US); Duke C. Chang, Hillsborough, NC (US); Leanne N. LeBlanc, New York, NY (US); Alexander Pikovsky, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 41 days.

This patent is subject to a terminal disclaimer.

(21) Appl. No.: 16/117,520

(22) Filed: Aug. 30, 2018

(65) Prior Publication Data

US 2018/0374157 A1 Dec. 27, 2018

Related U.S. Application Data

(63) Continuation of application No. 15/062,283, filed on Mar. 7, 2016, now Pat. No. 10,074,135, which is a (Continued)

(51) Int. Cl.
*G06Q 40/04* (2012.01)
*G06Q 40/00* (2012.01)
(Continued)

(52) U.S. Cl.
CPC ............ *G06Q 40/04* (2013.01); *G06F 16/28* (2019.01); *G06F 16/3329* (2019.01); *G06Q 40/12* (2013.12)

(58) Field of Classification Search
USPC .......................................................... 705/30
See application file for complete search history.

(56) References Cited

U.S. PATENT DOCUMENTS 6,968,533 B1  11/2005  Ueda et al.
8,005,724 B2   8/2011  Dunning et al.
(Continued)

FOREIGN PATENT DOCUMENTS

AU    2004224885 A1    6/2005
JP    2001-0273313 A   10/2001
(Continued)

OTHER PUBLICATIONS

International Preliminary Report on Patentability dated Jun. 30, 2016 for International Application No. PCT/JP2014/005158, 6 pages.
(Continued)

*Primary Examiner* — Garcia Ade
(74) *Attorney, Agent, or Firm* — Stephen J. Walder, Jr.; Reza Sarbakhsh

(57) ABSTRACT

Mechanisms are provided for performing an analysis of content based on a flow of property between entities. The mechanisms analyze a corpus of unstructured documents to identify one or more asset transfer flow relationships between entities. The mechanisms generate an asset transfer flow model defining a flow of an asset between entities based on the one or more asset transfer flow relationships between entities. The mechanisms input the asset transfer flow model into an analysis engine for use in analyzing content. The mechanisms analyze the content using the asset transfer flow model to generate results of the analysis and output the results of the analysis based on the asset transfer flow model.

20 Claims, 10 Drawing Sheets

Related U.S. Application Data continuation of application No. 14/135,214, filed on Dec. 19, 2013, now Pat. No. 10,424,016.

(51) Int. Cl.
*G06F 16/28* (2019.01)
*G06F 16/332* (2019.01)

(56) References Cited

U.S. PATENT DOCUMENTS

| | | | | |
|---|---|---|---|---|
| 8,463,593 | B2* | 6/2013 | Pell | G06F 16/3344 704/9 |
| 2005/0125322 | A1 | 6/2005 | Lacomb et al. | |
| 2009/0083278 | A1 | 3/2009 | Zhao et al. | |
| 2009/0138307 | A1 | 5/2009 | Belcsak et al. | |
| 2009/0216580 | A1 | 8/2009 | Bailey et al. | |
| 2009/0287678 | A1 | 11/2009 | Brown et al. | |
| 2011/0066587 | A1 | 3/2011 | Ferrucci et al. | |
| 2011/0125734 | A1 | 5/2011 | Duboue et al. | |
| 2011/0301941 | A1* | 12/2011 | De Vocht | G06F 40/216 704/9 |
| 2012/0010872 | A1* | 1/2012 | Zuev | G06F 40/30 704/9 |
| 2013/0007055 | A1 | 1/2013 | Brown et al. | |
| 2013/0018652 | A1 | 1/2013 | Ferrucci et al. | |
| 2013/0066886 | A1 | 3/2013 | Bagchi et al. | |
| 2014/0172914 | A1* | 6/2014 | Elnikety | G06F 16/9024 707/774 |
| 2014/0280352 | A1* | 9/2014 | Sam | G06F 16/86 707/793 |
| 2015/0178853 | A1 | 6/2015 | Donna et al. | |
| 2016/0189300 | A1 | 6/2016 | Byron et al. | |

FOREIGN PATENT DOCUMENTS

| | | |
|---|---|---|
| JP | 2005-158069 A | 6/2005 |
| WO | WO2007/147166 A2 | 12/2007 |

OTHER PUBLICATIONS

International Search Report and Written Opinion dated Dec. 16, 2014 for International Application No. PCT/JP2014/005158, 8 pages.
U.S. Appl. No. 14/135,214.
U.S. Appl. No. 15/062,283.
Byron, Donna K. et al., "Adapting Tabular Data for Narration", Filed Mar. 15, 2013, U.S. Appl. No. 13/838,130.
Byron, Donna K. et al., "Subject-Matter Analysis of Tabular Data", Filed Jul. 18, 2013, U.S. Appl. No. 13/945,259.
Gildea, Daniel et al., "Automatic Labeling of Semantic Roles", Association for Computational Linguistics, Computational Linguistics Journal 28(3), 2002, 44 pages.
Girju, Roxana et al., "Automatic Discovery of Part-Whole Relations", Association for Computational Linguistics, Computational Linguistics Journal 32(1), 2006, 54 pages.
High, Rob, "The Era of Cognitive Systems: An Inside Look at IBM Watson and How it Works", IBM Corporation, http://ip.com/pdf/redbook/REDP495500.pdf, Dec. 12, 2012, 16 pages.
McCord, M.C. et al., "Deep parsing in Watson", IBM J. Res. & Dev. vol. 56 No. 3/4 Paper 3, May/Jul. 2012, pp. 3:1-3:15.
Yuan, Michael J., "Watson and healthcare, How natural language processing and semantic search could revolutionize clinical decision support", IBM Corporation, IBM developerWorks, http://www.ibm.com/developerworks/industry/library/ind-watson/, Apr. 12, 2011, 14 pages.

\* cited by examiner

AIRLINE SHARES OF ENPLANED PASSENGERS
CHICAGO O'HARE INTERNATIONAL AIRPORT
(2005-2009)[1]

| AIRLINES | 2005 ENPLANED PASSENGERS | SHARE | 2006 ENPLANED PASSENGERS | SHARE | 2007 ENPLANED PASSENGERS | SHARE | 2008 ENPLANED PASSENGERS | SHARE | 2009 ENPLANED PASSENGERS | SHARE |
|---|---|---|---|---|---|---|---|---|---|---|
| 1. United | 13,035,044 | 34.3% | 12,905,929 | 34.2% | 12,798,917 | 33.9% | 11,099,544 | 32.6% | 10,304,138 | 32.2% |
| 2. American | 10,880,167 | 28.7% | 10,283,798 | 27.2% | 10,227,846 | 27.2% | 9,291,364 | 27.3% | 8,050,514 | 25.2% |
| 3. American Eagle | 3,249,766 | 8.6% | 3,524,127 | 9.3% | 3,424,753 | 9.1% | 3,145,183 | 9.2% | 3,128,488 | 9.8% |
| 4. SkyWest | 1,385,206 | 3.7% | 2,333,968 | 6.2% | 2,231,622 | 5.9% | 2,010,239 | 5.9% | 1,763,788 | 5.5% |
| 5. Mesa | 517,511 | 1.4% | 1,032,938 | 2.7% | 1,227,446 | 3.3% | 1,032,402 | 3.0% | 1,327,751 | 4.2% |
| 6. US Airways | 580,460 | 1.5% | 474,309 | 1.3% | 578,879 | 1.5% | 892,225 | 2.6% | 923,729 | 2.9% |
| 7. Shuttle America | 282,928 | 0.7% | 929,674 | 2.5% | 729,184 | 1.9% | 689,619 | 2.0% | 858,634 | 2.7% |
| 8. GoJet | 39,056 | 0.1% | 432,179 | 1.1% | 449,979 | 1.2% | 399,076 | 1.2% | 567,601 | 1.8% |
| 9. Continental | 461,804 | 1.2% | 486,762 | 1.3% | 584,908 | 1.5% | 519,567 | 1.5% | 514,528 | 1.6% |
| 10. Trans States | 259,510 | 0.7% | 384,147 | 1.0% | 390,640 | 1.0% | 464,624 | 1.4% | 450,469 | 1.4% |
| 11. Northwest® | 576,618 | 1.5% | 626,705 | 1.7% | 680,695 | 1.8% | 586,600 | 1.7% | 439,517 | 1.4% |
| 12. Delta® | 603,677 | 1.6% | 518,373 | 1.4% | 443,342 | 1.2% | 430,985 | 1.3% | 311,533 | 1.0% |
| 13. Lufthansa German | 255,679 | 0.7% | 256,847 | 0.7% | 262,556 | 0.7% | 295,871 | 0.9% | 277,629 | 0.9% |
| 14. Mexicana | 295,386 | 0.8% | 282,195 | 0.7% | 251,267 | 0.7% | 277,874 | 0.8% | 273,631 | 0.9% |
| 15. Alaska | 166,669 | 0.4% | 185,446 | 0.5% | 188,228 | 0.5% | 194,339 | 0.6% | 209,670 | 0.7% |
| Other | 5,358,506 | 14.1% | 3,107,047 | 8.2% | 3,242,800 | 8.6% | 2,681,674 | 7.9% | 2,555,860 | 8.0% |
| AIRPORT TOTAL® | 37,947,987 | 100.0% | 37,764,444 | 100.0% | 37,763,062 | 100.0% | 34,011,187 | 100.0% | 31,957,480 | 100.0% |
| United Carriers Combined | 17,918,232 | 47.2% | 18,170,592 | 48.1% | 17,868,046 | 47.3% | 15,695,180 | 46.1% | 15,268,036 | 47.8% |
| American Carriers Combined | 14,129,933 | 37.2% | 13,807,925 | 36.6% | 13,702,599 | 36.3% | 12,436,547 | 36.6% | 11,179,002 | 35.0% |

FIG. 4A

O'Hare is the primary commercial airport for the City. O'Hare occupies approximately 7,265 acres of land and is located 18 miles northwest of the City's central business district. Based on preliminary data from Airports Council International ("*ACI*"), for the 12 month period ended November 2009, O'Hare was the second busiest airport in the world, measured in terms of total aircraft operations, and the fourth busiest in the world, measured in terms of total passengers. According to the Chicago Department of Aviation ("*CDA*"), O'Hare had approximately 32.0 million enplaned passengers in 2009 and approximately 34.0 million enplaned passengers in 2008. United Airlines and American Airlines both maintain hubs at O'Hare. United Airlines (including its regional/commuter affiliates operating as United Express) accounted for 47.8 percent of the enplaned passengers at O'Hare in 2009. American Airlines (including its regional/commuter subsidiary, American Eagle) accounted for 35.0 percent of the enplaned passengers at O'Hare in 2009. See "CHICAGO O'HARE INTERNATIONAL AIRPORT," "OPERATIONS AT O'HARE" and "CERTAIN INVESTMENT CONSIDERATIONS RELATING TO THE AIRLINES, THE AIRLINE INDUSTRY AND O'HARE."

FIG. 4B

FLOW OF FUNDS

Revenues and expenses of O'Hare are accounted for as a separate enterprise fund of the City, subject to the provisions of the General Airport Revenue Bond Ordinance and the Airport Use Agreements. Under the General Airport Revenue Bond Ordinance, Revenues, including amounts collected by the City in order to satisfy deposit requirements established in any resolution, ordinance or indenture securing Junior Lien Obligations (including the deposit requirements established in the Third Lien Indenture), are required to be deposited to the credit of the Revenue Fund in the name of the First Lien Trustee with a depository or depositories, each fully qualified under the provisions of the General Airport Revenue Bond Ordinance to receive the same as deposits of money held by the First Lien Trustee. The First Lien Trustee shall be accountable only for moneys actually so deposited.

HISTORICAL OPERATING RESULTS
CHICAGO O'HARE INTERNATIONAL AIRPORT
2004-2008
(IN THOUSANDS)

| | 2004 | 2005 | 2006 | 2007 | 2008 |
|---|---|---|---|---|---|
| OPERATING REVENUES | | | | | |
| Landing Fees | $131,406 | $157,791 | $159,094 | $179,076 | $181,283 |
| Rental Revenues | | | | | |
| Terminal Rentals/Use Charges | 96,870 | 140,038 | 145,417 | 211,732 | 235,210 |
| Other Rentals/Fueling System Fees | 35,316 | 36,365 | 40,172 | 51,026 | 47,378 |
| Sub-Total Rental Revenues | 132,186 | 176,403 | 185,589 | 262,758 | 282,588 |
| Concessions: | | | | | |
| Auto Parking | 90,421 | 95,521 | 98,613 | 103,137 | 108,545 |
| Auto Rentals | 17,340 | 19,604 | 19,928 | 22,376 | 22,213 |
| Restaurants | 27,161 | 29,790 | 33,401 | 34,904 | 34,813 |
| News/Gifts | 11,001 | 11,893 | 12,357 | 13,267 | 14,640 |
| Other (1) | 21,501 | 33,125 | 30,374 | 34,909 | 34,912 |
| Sub-Total Concessions | 167,424 | 189,933 | 194,673 | 208,593 | 215,123 |
| Reimbursements | 11,553 | 8,750 | 6,560 | 2,336 | 5,288 |
| Total Operating Revenues | $442,569 | $532,877 | $545,916 | $652,763 | $684,282 |
| OPERATION AND MAINTENANCE EXPENSES | | | | | |
| Salaries and Wages (2) | $153,926 | $157,116 | $168,361 | $177,800 | $177,418 |
| Repairs and Maintenance | 66,066 | 73,903 | 73,591 | 83,865 | 100,341 |
| Energy | 22,270 | 30,894 | 29,118 | 35,924 | 38,535 |
| Materials and Supplies | 8,228 | 9,338 | 5,120 | 10,411 | 17,506 |
| Engineering and Other Professional Services | 35,533 | 52,142 | 45,357 | 56,506 | 61,514 |
| Other Operating Expenses | 31,807 | 28,572 | 33,038 | 33,628 | 33,196 |
| Total Operation and Maintenance Expenses | | | | | |
| Before Depreciation and Amortization | $317,830 | $351,965 | $354,585 | $398,134 | $428,510 |

The 2010 Third Lien Bonds (as defined herein) will be limited obligations of the City of Chicago (the "*City*"), payable from and secured by a pledge of Third Lien Revenues (as herein defined) derived from the operation of Chicago O'Hare International Airport ("*O'Hare*"). The 2010F Third Lien Bonds (as defined herein) will also be payable from and secured by a pledge of annual payment amounts for each of the Fiscal Years (as defined herein) 2010 to 2018, both inclusive (the "*Pledged Other Available Moneys*") to be derived from a subordinate pledge of PFC Revenues (as defined herein), including moneys to be withdrawn from the PFC Capital Fund (as defined herein). The 2010 Third Lien Bonds other than the 2010F Third Lien Bonds will not be secured by Pledged Other Available Moneys. The 2010 Third Lien Bonds will be secured on a parity basis as to the Third Lien Revenues with the City's Existing Third Lien Bonds (as defined herein) and such other Third Lien Obligations (as defined herein) as may be outstanding from time to time, as more fully described herein. The claim of the 2010 Third Lien Bonds to the net revenues of O'Hare is subordinate and junior in right of payment to the claim of the City's First Lien Bonds (as defined herein) and Second Lien Obligations (as defined herein). The claim of the 2010F Third Lien Bonds to the PFC Revenues of O'Hare is subordinate and junior in right of payment to the claim of the City's PFC Obligations (as defined herein) and subject to certain other rights and obligations of the city as described under the heading "SECURITY FOR THE 2010 THIRD LIEN BONDS." Neither the faith and credit nor the taxing power of the City, the State of Illinois or any political subdivision of the State of Illinois will be pledged to the payment of the principal of or interest on the 2010 Third Lien Bonds. No property of the City (including property at O'Hare) is pledged as security for the 2010 Third Lien Bonds.

FIG. 4D

MODELING ASSET TRANSFER FLOW RELATIONSHIPS DISCOVERED IN UNSTRUCTURED DATA

This application is a continuation of application Ser. No. 15/062,283, filed Mar. 7, 2016, status awaiting publication. Further, application Ser. No. 15/062,283 is a continuation of application Ser. No. 14/135,214, filed Dec. 19, 2013, status pending.

BACKGROUND

The present application relates generally to an improved data processing apparatus and method and more specifically to mechanisms for modeling asset transfer flow relationships discovered in unstructured data.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, various types of knowledge resources have been devised including databases, knowledge bases, and the like. Recently, research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the Watson™ system available from International Business Machines (IBM) Corporation of Armonk, N.Y. The Watson™ system is an application of advanced natural language processing, information retrieval, knowledge representation and reasoning, and machine learning technologies to the field of open domain question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Various United States patent application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model

SUMMARY

In one illustrative embodiment, a method, in a data processing system comprising a processor and a memory, for performing an analysis of content based on a flow of property between entities is provided. The method comprises performing, by the data processing system, analysis of a corpus of unstructured documents to identify one or more asset transfer flow relationships between entities. The method further comprises generating, by the data processing system, an asset transfer flow model defining a flow of an asset between entities based on the one or more asset transfer flow relationships between entities. In addition, the method comprises inputting, by the data processing system, the asset transfer flow model into an analysis engine for use in analyzing content. Moreover, the method comprises analyzing, by the data processing system, the content using the asset transfer flow model to generate results of the analysis. The method also comprises outputting, by the analysis engine, the results of the analysis based on the asset transfer flow model.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 4A-E illustrate various documents that may be part of a corpus whose domain is the airline industry;

DETAILED DESCRIPTION

Figure 1:
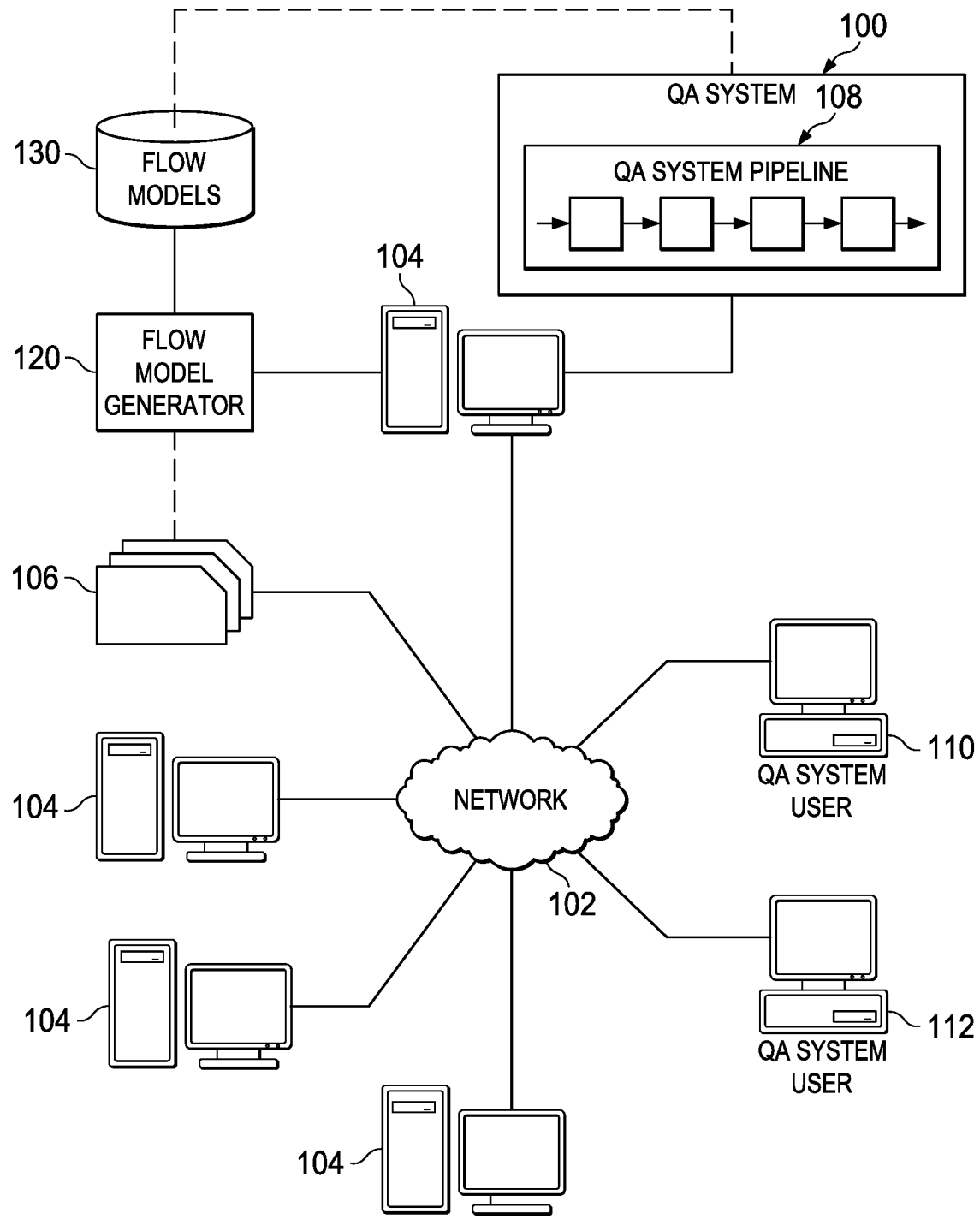
FIG. 1 depicts a schematic diagram of one illustrative embodiment of a question and answer (QA) system in a computer network.

The illustrative embodiments provide mechanisms for performing asset transfer flow relationship identification in unstructured data so as to generate one or more knowledge resources for use in modeling the asset transfer flows and for subsequent analysis. In one illustrative embodiment, these asset transfer flows are monetary flows indicating how monetary funds flow from one entity to another and the type of monetary flow, e.g., particular fees, taxes, payments, or the like. However, it should be appreciated that the present invention is not limited to identifying monetary flows and may be applied to the flow of any tangible or intangible good/property or legal right, i.e. any asset, from one entity to another. Monetary flows will be used throughout this description but are intended to be a non-limiting example of one implementation of the illustrative embodiments.

The illustrative embodiments identify these asset transfer flow relationships from unstructured data, e.g., documents in a corpus of documents, and use these asset transfer flow relationships to build a model of the asset transfer flow identifying the entities involved and the direction and type of asset transfer flow from one entity to another. This model of the asset transfer flow may be stored as a knowledge resource, such as a directed acyclic graph, database, table data structure, or the like, that may be used by analysis engines to generate results taking into account the asset transfer flow model.

In one illustrative embodiment, the analysis engine may be a Question and Answer (QA) system that may utilize the asset transfer flow model to answer questions submitted to the QA system either alone or in combination with additional information obtained from a corpus of documents upon which the QA system operates to obtain candidate answers for a submitted question. While the description hereafter will assume that the mechanisms of the illustrative embodiments are being utilized in conjunction with a QA system, the illustrative embodiments are not limited to such and may be used in conjunction with any analysis engine that may make use of an asset transfer flow model to perform its operations, such as a financial analysis engine that determines the financial position of an organization, a debt quality analysis engine, or any predictive asset transfer modeling engine, for example.

In generating the illustrative embodiments outlined herein, it is recognized that knowledge resources that organize domain-specific concepts are ubiquitous in intelligent applications. Relations in these knowledge resources can be implemented as one or more graphs that are traversed to support a variety of data analysis needs, e.g., inference and similarity calculations. Two types of relationships modeled in concept graphs that may be used in this regard are containment relations (either subtype-supertype hierarchies or part/whole hierarchies) and selectional restrictions, or semantic role labels, which express constraints on actors in a relationship. For example, the concepts of a concept graph may include items of the type PERSON, EAR, ANIMAL, WEATHER, GEOGRAPHIC REGION, MOVIE, ACTOR, etc. A subtype/supertype relation exists between ACTOR and PERSON. A part/whole relation links EAR and PERSON. A selectional restriction represents which of these categories can perform certain kinds of actions in the domain. For example, for an entity to DIRECT a MOVIE, that entity must be a PERSON. Some application areas, such as medical and geographic reasoning areas, may benefit greatly from domain-specific reasoning and containment relations.

Domains directed to the flow of tangible/intangible goods/property or legal rights, and in particular the domain of commerce and finance, include a large variety of terminology and concepts that express the transfer of the goods/property or legal rights, e.g., revenue or payment relations. These can be thought of as a novel type of part/whole relationship. For example, using the commerce and finance domain as an example from here on in this description, the payee's financial health is partly determined by the payer's financial health. Moreover, particular subtypes of revenue streams are received only from particular kinds of payers, e.g., property owners pay property tax to municipalities, airlines pay gate fees to airports, individuals pay ticket fees to airlines, municipalities pay bond payments to bondholders, etc. These monetary flow relations can be thought of as a specialized kind of semantic role restrictions and can be discovered from unstructured data by adapting computational linguistic techniques to discover selectional restrictions, i.e. semantic role restrictions.

As examples of statements in unstructured data that may be used to identify such monetary flows, consider the following statements:

"A plan the city announced Wednesday to impose a traffic congestion fee on drivers who park at downtown garages and lots represents a good first move to encourage more people to ride mass transit."

"Drivers parking in public garages and lots in the central business district would pay an extra $2 on weekdays under Emanuel's plan. It would come on top of the current $3 city parking tax that goes into the general fund, officials say." From these statements, one may deduce that drivers pay traffic congestion fees to the city. Various techniques may be used to automatically discover such a monetary flow relationship within unstructured data including using linguistic patterns that may be induced from a seed set of examples of the relation. Patterns may be specific to the domain, e.g., in the transportation domain the statement "United Airlines has its hub at O'Hare" indicates that United Airlines is a principal customer of O'Hare. Therefore, that pattern would be one of many used to populate a graph with financial relations, such as the relation that United Airlines revenue is part of O'Hare revenue. Once such part-whole monetary flow relations and the semantic role restrictions are populated into a knowledge resource, the knowledge resource can be used for natural language processing and reasoning in a variety of financial analysis scenarios.

It should be appreciated, however, that the lexical indications of asset transfer relations between entities are heterogeneous across the set of relations. In other words, the words used to express financial or asset transfers between particular payers/payees changes throughout the graph or model, although the underlying quality of the relation (the fact that it represents an asset transfer) is homogeneous throughout the graph or model. This degree of heterogeneity does not exist in other scenarios where known natural language processing techniques are applied.

For example, if one wants to populate a table with authors and books, a first step of acquiring lexical templates for the "Author of" relation can proceed in two ways. In a first approach, one may use human-created lists of templates, such as "X wrote Y", "X, author of Y", or "Y, written by X", for example, to identify expressions in documents indicative of relationships between authors and books. These example templates have hard-coded the fact that "wrote" and ", the author of" are alternate surface expressions for the "Author of" relation.

In a second approach, one may harvest or extract templates from documents using a two step process. First, a set of pairs of X and Y are generated where the strings for X and Y are taken from a manually populated seed set of particular authors and their book titles, e.g., X="Pearl S. Buck" and Y="The Good Earth." Second, sentences in documents that include both X and Y are identified and it is assumed that the words that fall between X and Y in the discovered sentences are in fact a way to express the relation "Author of." Third, additional sentences are discovered from the collection of documents that match the same patterns discovered in the second step, thereby harvesting or extracting additional proper names in the positions of X and Y, which are saved in a populated store of X related to Y facts, in this example X "Author of" Y.

It should be noted that the set of expressions used to find related entities is homogeneous through the populated store in these approaches. Thus, these approaches will break down if, for example, authorship of science fiction books were described in a different manner or with different wording than authorship of historical non-fiction, for example. In addition, these approaches assume a 2-argument relation (X and Y in the above example). These approaches do not allow for a 3 or more argument relation.

With the mechanisms of the illustrative embodiments, the identification of asset transfer flow relations in documents is considered a type of meronymy (part/whole relation) that is a 3 or more way relation rather than the 2-way relation of the above approaches. For example, an asset transfer flow relation may be defined as a 3-tuple (X, Y, Z) where X is the origin entity for the asset transfer, Y is the destination entity for the asset transfer, and Z is the asset transfer type, e.g., gate fees, parking fees, toll, tax, assignment of right, or the like. Moreover, the mechanisms of the illustrative embodiments may identify asset transfer flow relations taking into account the fact that many different expressions of asset transfer relations apply only between particular kinds of origin/destination entities, i.e. the expressions are heterogeneous across the documents, corpus, or corpora used to identify such asset transfer flow relations.

The mechanisms of the illustrative embodiments assume the presence of a corpus of unstructured information, e.g., documents, portions of documents, or any other portions of text data. This unstructured information may include, for example, financial documents, news stories, company records, internal financial analyst reports, or the like. While the illustrative embodiments may be used with unstructured information, these illustrative embodiments may also be used with structured stores, such as databases and the like.

The illustrative embodiments populate a seed list of related tuples that exhibit an asset transfer flow relation. This seed list may be obtained from a variety of sources. For example, the seed list may be manually created by a subject matter expert, created from querying structured stores, or extracted from documents using natural language processing (NLP) techniques. In some illustrative embodiments, the logic and rules for identifying these seed sets may be customized to a particular domain, e.g., financial domain, medical domain, or the like. The illustrative embodiments, in generating the seed list, may identify 3-argument tuples for identifying an asset transfer flow relation, such as described above (this is assuming a 3-argument tuple implementation is being used). In some cases, incomplete 3-argument tuples may be produced, e.g., containing only 2 of the 3 arguments. For example, documents from O'Hare airport may contain an Operating Revenues table that can be used to gather a list of asset transfer types for O'Hare airport (landing fees, rental revenues, fees from concessionaires, etc.) while a table of airlines with the most enplaned passengers in another document shows a list of companies that are the origin of asset transfers to O'Hare airport, yet this second table does not also list the asset transfer types. However, using a corpus of financial documents, the types of expenses paid by the airlines can be found to complete the open argument for the asset transfer type argument of the 3-argument tuple.

After generating the seed list of related tuples that exhibit an asset transfer flow relation, one or more documents of one or more corpora may be analyzed to identify sentences or portions of content (e.g., tables, titles, metadata, or the like) containing the arguments of the tuples. These portions of content (e.g., sentences) are then data mined for patterns that represent the lexicalization of the relation captured in the tuple. For example, part-whole relationship identification mechanisms, or other machine learning mechanisms may be used to find the features exhibited in these portions of content (lexical features, syntactic features, and the like) that can be reliably used to identify future portions of content that express the same relation tuple. For example, a mechanism that identifies part-whole relationships in unstructured data is described in Girju et al., "Automatic Discovery of Part-Whole Relations," Computational Linguistics Journal 32(1), 2006. An example of a mechanism that may be employed to identify semantic role restrictions is described in Gildea et al., "Automatic Labeling of Semantic Roles," Computational Linguistics Journal 28(3), 2002. Either or both of these mechanisms may be used to assist in the mining of portions of content to identify the patterns representing the relation.

It should be appreciated that the detection of part-whole relations as described in the Girju reference, prior to the present invention, has been limited to physical domains such as repair manuals in which physical systems are comprised of a plurality of physical parts, construction processes where physical constructs are comprised of a plurality of physical parts, and mechanical mechanisms which are clearly physical combinations of physical parts. These part-whole mechanisms have not been implemented in any mechanism for identifying flows, let alone flows of tangible/intangible objects/property, from one entity to another or legal rights from one entity to another. Moreover, in areas of flows, prior to the present invention, it has been required that analytic tools use manually created models to identify the flows from one entity to another. There has not been any automated mechanism for generating such asset transfer flows, let alone doing so using part-whole relationship and semantic role restriction analysis of unstructured documents, as in the presently disclosed invention.

In addition, other mechanisms that may be used to extract factual information from sentences or portions of unstructured data include mechanisms for adapting tabular data for natural language processing and mechanisms for discovering functional dependencies in tabular data as described in co-pending and commonly assigned U.S. patent application Ser. Nos. 13/838,130 and 13/945,259. These mechanisms, as well as other mechanisms, such as pattern matching rules and the like, may be augmented and modified by the mechanisms of the illustrative embodiments to identify monetary flows, or flows of tangible/intangible goods/property and/or legal rights, in unstructured data, e.g., documents of a corpus, or structured data in structured stores, e.g., databases or the like.

The illustrative embodiments utilize such mechanisms to automatically populate a data structure representing asset transfer flow relationships (e.g., financial relations, or relations of the flow of tangible/intangible goods/property and/or legal rights) from unstructured data via natural language processing, e.g., identifying part-whole relationships between financial entities and correlating these part-whole relationships to identify entire multi-level flows of tangible/intangible goods/property and/or legal rights from one entity to another. As part of this process, incomplete tuples generated in the previous operations may be completed by having the missing arguments populated. For example, in the mining of the portions of content to identify patterns representative of the tuple, patterns for features that lead to a specific element in a tuple are harvested, such as the words used to express payments of landing fees or transfers of mineral rights, or the entities that are the payees in such relationships.

From the resources gathered as a part of the mining of the portions of content of the documents of the corpus, various types of clusters are generated. For example, clusters of wordings used for particular payment types may be generated. These clusters represent the heterogeneous nature of the graph or model previously described above. For example, a government authority may "levee payments" for gate fees or "collect" a tax for fuel use, etc. The words for the activity of demanding or paying/transferring assets of particular types may vary based on the context even though all of the words convey the transfer of assets.

In addition, clusters of generalizations from instance to type may be generated to formulate selectional restrictions for the type of entity that can participate in each relationship. A clustering algorithm, such as described in Gildea et al., "Automatic Labeling of Semantic Roles," Computational Linguistics Journal 28(3), 2002, or the like, may be employed to determine that, for example, only airline companies pay gate fees, only drivers who park downtown pay the extra parking tax, only airline passengers pay ticket prices, both businesses and individuals pay for rental cars, etc. These clusters are expressed as a probability distribution over the type of each of the entities that has been put into payee, payer positions (positions X and Y) in the populated tuples. Such resources are used to constrain additional inferences made using the tuple graphs.

Thus, the illustrative embodiments populate containment relations and semantic role restrictions from relations extracted from unstructured data. Thereafter, the populated containment relations and semantic role restrictions are generalized to generate relational rules defining the relationships between entities of flow. With regard to the populating of containment relations, as discussed above, asset transfer flow relations, e.g., part-whole relations, are extracted from a document corpus, such as by using one of the mechanisms previously mentioned above or other pattern matching or other types of natural language processing mechanisms. Using techniques for extracting facts from tabular information, such as described in the co-pending and commonly assigned U.S. patent applications described above, facts from financial disclosures, annual reports, etc., are added to the knowledge resources. In addition, narrative text may be mined by utilizing linguistic patterns that describe financial/customer/payment/monetary relations. Any source document can be used, such as financial disclosures, news articles, analyst reports, or other documents. Both positive (money flows in) and negative (sink of money flowing out) relations are captured from each discovered fact. In some illustrative embodiments, relationship mining in unstructured document is not limited to relations between entities, such as United Airlines and O'Hare, but also may encompass more granular relations within the funding structure of a particular entity, such as the precedence rules of funds collected from municipal bonds within the financial structure of a municipal authority. Such granular relations are described in textual documents using fairly regular language which can be mined using natural language processing (NLP) techniques.

With regard to populating semantic role restrictions, mechanisms such as described above may be used, for each sentence in the input that expresses payment relations, such as by having phrases of the type X "pays rental fees to" Y or X "received tax payments from" Y, or the like, the semantic label of the predicate, financial entity type, payer, and payee may be captured. These semantic role restrictions, also referred to as selectional restrictions, essentially identify causality flows. For example, a semantic role restriction may be that "property owners pay property taxes to municipalities." Thus, a causality is established in that the financial viability of the municipality is dependent, to some extent, on the property taxes paid by property owners. Similarly, other types of semantic role restrictions such as "airlines pay gate fees to airports", "individuals pay ticket fees/airfares to airlines", "municipalities pay bond payments to bondholders", and the like show various causality flows. The semantic role restrictions for a monetary flow may have the form <predicate>, <financial entity type>, <payer>, and <payee>, for example. It can be seen from the examples above that such semantic role restrictions may be chained together to determine larger causality flows, e.g., property owners pay property taxes to municipalities and municipalities pay bond payments to bondholders and thus, payments to bondholders are to some extent dependent upon property tax payments by property owners to the municipalities.

As mentioned above, various mechanisms may be used to extract these types of part-whole relations and semantic role restrictions from unstructured data, e.g., documents in a corpus of documents. This may involve extracting dependency relations from table structures in documents, performing natural language processing based on predefined or learned (through machine learning techniques) patterns of terms, using seed patterns to find instances that match the seed patterns and then use those instances to identify additional patterns with different terminology, or the like. The patterns and mechanisms for extracting such relations may be tuned to the particular domain or corpus being processed, e.g., there may be different patterns and extraction logic for the financial domain as opposed to a medical domain, legal domain, or the like.

Once the containment relations and semantic role restrictions are populated through the application of natural language processing techniques including part-whole relation identification, dependency information extracted from table data structures, and other pattern or rule based logic for identifying such containment relations and semantic role restrictions, the illustrative embodiment generalize the relations and restrictions of the monetary flow where possible. The generalization may identify multiple instances of similar relations or patterns in the relations. If multiple instances of similar relations or patterns in relations are found, then the instances of the relation/pattern may be analyzed to identify similarities in the entities specified in the relations/patterns. Based on the categories or classifications of the entities, the relations/patterns may be generalized using the categories or classifications of the entities.

For example, based on collected specific facts found as part of the populating of the containment relations and semantic role restrictions, the named entity is generalized to the category or classification of the named entity. For example, if many instance of "X pays property tax to Y" include a business entity as X and a municipality of Y, then the generalization of this relationship is that "Businesses pay property tax to Municipalities." This generalized relationship may then be added to the asset transfer flow model along with the other relations and restrictions identified during the steps of populating containment relations and semantic role restrictions.

It should be appreciated that the relations created using the above mechanisms are directed relations, not symmetrical relations. Therefore, the asset transfer flow model that is populated with these relations can be used as a directed acyclic graph. The directed acyclic graph corresponding to the asset transfer flow model may be configured such that each pair of vertices in the graph is connected by a directed link representing the asset transfer. This directed acyclic graph is useful for part-whole (meronymy) reasoning in any of a variety of applications. During dynamic interpretation of the asset transfer flow model, each incoming link to a vertex in the corresponding directed acyclic graph represents an asset transfer, and the asset thus transferred is considered to be a portion of the aggregate asset held by the entity represented in the destination vertex node (the receiving entity). Each transfer represents an increase to the receiving entity's sum of assets and a diminishment of the asset pool of the source or origin vertex node entity. Therefore, the asset on the incoming node can be conceived of as a "part of" the aggregate asset in the destination node. The directed link between a pair of nodes can be further augmented by detailed information, such as the percentage contribution of the receiving entity's entire asset base, timing information, precedence information (as in the case of debt obligations paid to bondholders), and the like. The additional detailed information augmenting the directed link may be added manually by a subject matter expert or via an additional automated mechanism.

The resulting asset transfer flow model comprising the discovered containment relations, semantic role restrictions, and generalized relations, may be stored in a data structure in a data storage system in association with a natural language processing analysis system, such as a Question and Answer (QA) system, for example. The asset transfer flow model may be used to assist in processing requests submitted to the natural language processing analysis system and in processing other unstructured data in which asset transfer flow information may be present. For example, with a QA system implementation, the asset transfer flow model may be used to assist in answering input questions submitted to the QA system which are directed to a financial domain. In a similar way, if other types of flows are identified through the process above, e.g., any flow of tangible/intangible goods/property or legal rights, the particular asset transfer flow model may be used in conjunction with a corresponding domain to answer questions directed to that domain. Moreover, the asset transfer flow model may be used to process documents or other unstructured data in a corpus to analyze the documents/unstructured data to identify candidate answers for the QA system.

Thus, for example, a user may submit a question of the type "Why are my property taxes higher this year" and the QA system may look to the asset transfer flow model, e.g., the directed acyclic graph representation of the asset transfer flow model, to identify flow relationships with regard to property tax to thereby identify the elements contributing to property tax rates. The identification of the contributing elements to property tax may then be used, along with information extracted from the originally input question, to generate queries that are applied to a corpus of documents. For example, it may be determined from the asset transfer flow model that one contributing factor to property tax is school expenditures with the relationship showing that property taxes flow to school expenditures. Knowing this relationship, a query directed to school expenditures may be applied to the corpus to identify information in documents directed to school expenditures. In addition, information from the original input question and/or the submitter of the original input question, may be used to further direct the queries applied to the corpus. For example, if it is known that the user that submitted the question to the QA system resides in Dallas county, Texas, then the queries applied to the corpus may be more specifically directed to the school expenditures associated with Dallas county, Texas. Finding a document in the corpus describing the building of a new high school in Dallas county, Texas and the increase in school expenditures as a result, may thus be identified and used as a basis for answering the user's original input question. The document itself may not make any mention of property taxes, however because of the information obtained from the asset transfer flow model generated from the unstructured data, the document may be identified as containing a candidate answer to the user's question when it otherwise may not have been identified since it does not specifically address property tax. Hence, an answer to the user's input question may be that "one factor for the increase in your property tax is an increase in school expenditures for the building of a new high school in Dallas county, TX." Of course multiple answers may be generated based on multiple contributors to property tax as may be identified in the asset transfer flow model.

Thus, the illustrative embodiments provide mechanisms for using unstructured data to extract asset transfer flow relationships and semantic role restrictions to thereby identify a model of a flow of tangible/intangible goods/products or legal rights from one entity to another. The generated asset transfer flow model is then provided to a natural language processing (NLP) system that uses the generated asset transfer flow model to process requests submitted to the NLP system directed to the domain associated with the generated asset transfer flow model. In one illustrative embodiment, the NLP system comprises a QA system that answers questions submitted to the QA system. The generated asset transfer flow model assists the QA system in processing the input question to determine what queries should be submitted to the corpus, and for processing the returned candidate answers from the corpus so as to answer the original input question.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium is any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As mentioned above, the present invention provides mechanisms for generating or building an asset transfer flow model for modeling the flow of tangible/intangible objects/property and/or legal rights from one entity to another. This asset transfer flow model is generated from analysis of unstructured data, such as a corpus of documents, by applying part-whole relationship detection logic, semantic role restriction logic, tabular data dependency relationship detection logic, and the like, to extract relationships between entities and the goods/products/rights that flow from one entity to another. The asset transfer flow model is then used to assist in the processing of requests by an analysis system, such as a NLP system. In order to further describe illustrative embodiments of the present invention, it will be assumed that the NLP system that utilizes the flow model generated by the mechanisms of the present invention is a Question and Answer (QA) system, such as the Watson QA system available from International Business Machines Corporation of Armonk, N.Y. As such, the following figures are directed illustrating the manner by which a QA system operates and how the mechanisms of the illustrative embodiments may be integrated into such operation.

Figure 2:
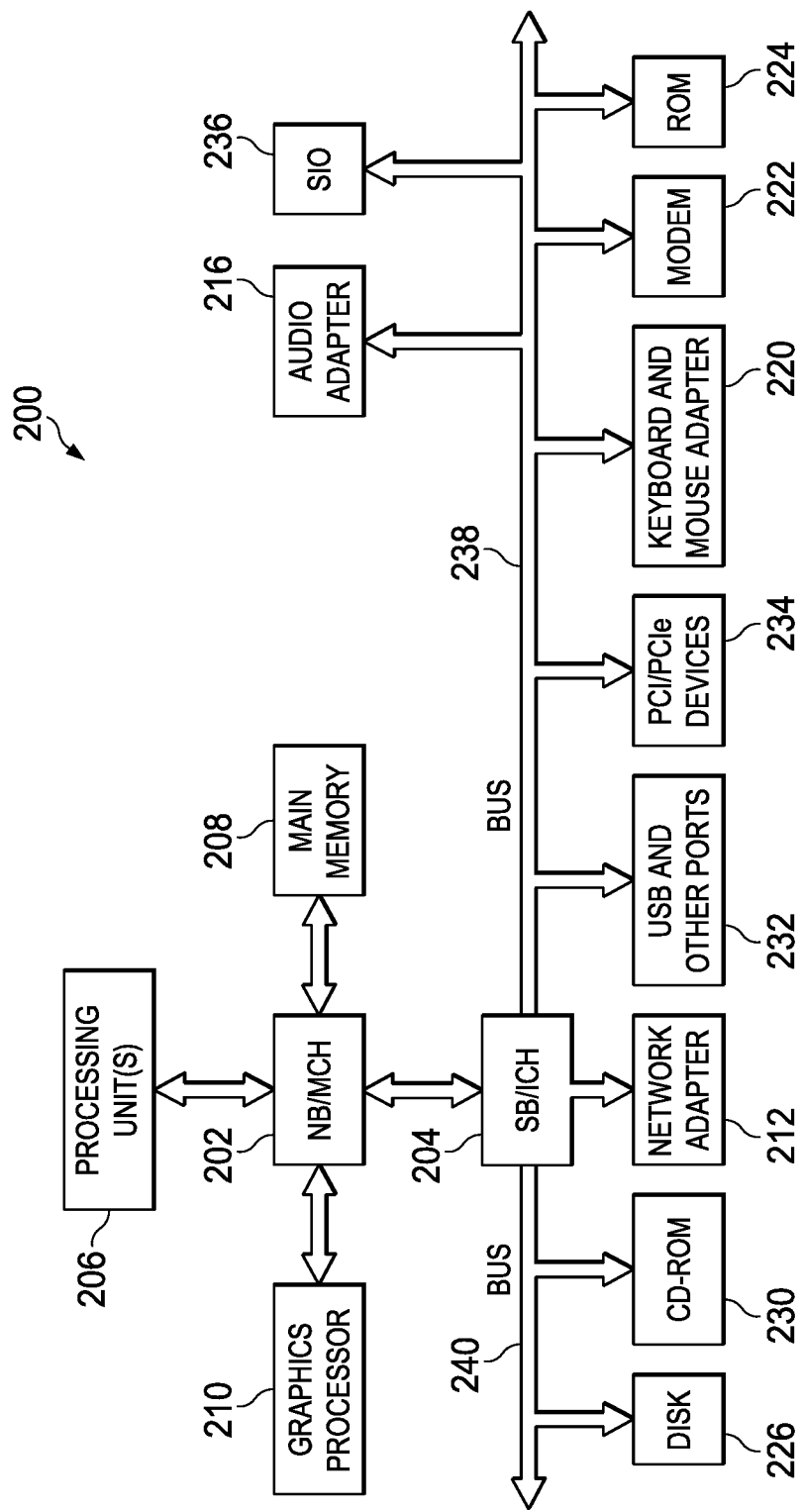
FIG. 2 is a block diagram of an example data processing system in which aspects of the illustrative embodiments may be implemented.
Figure 3:
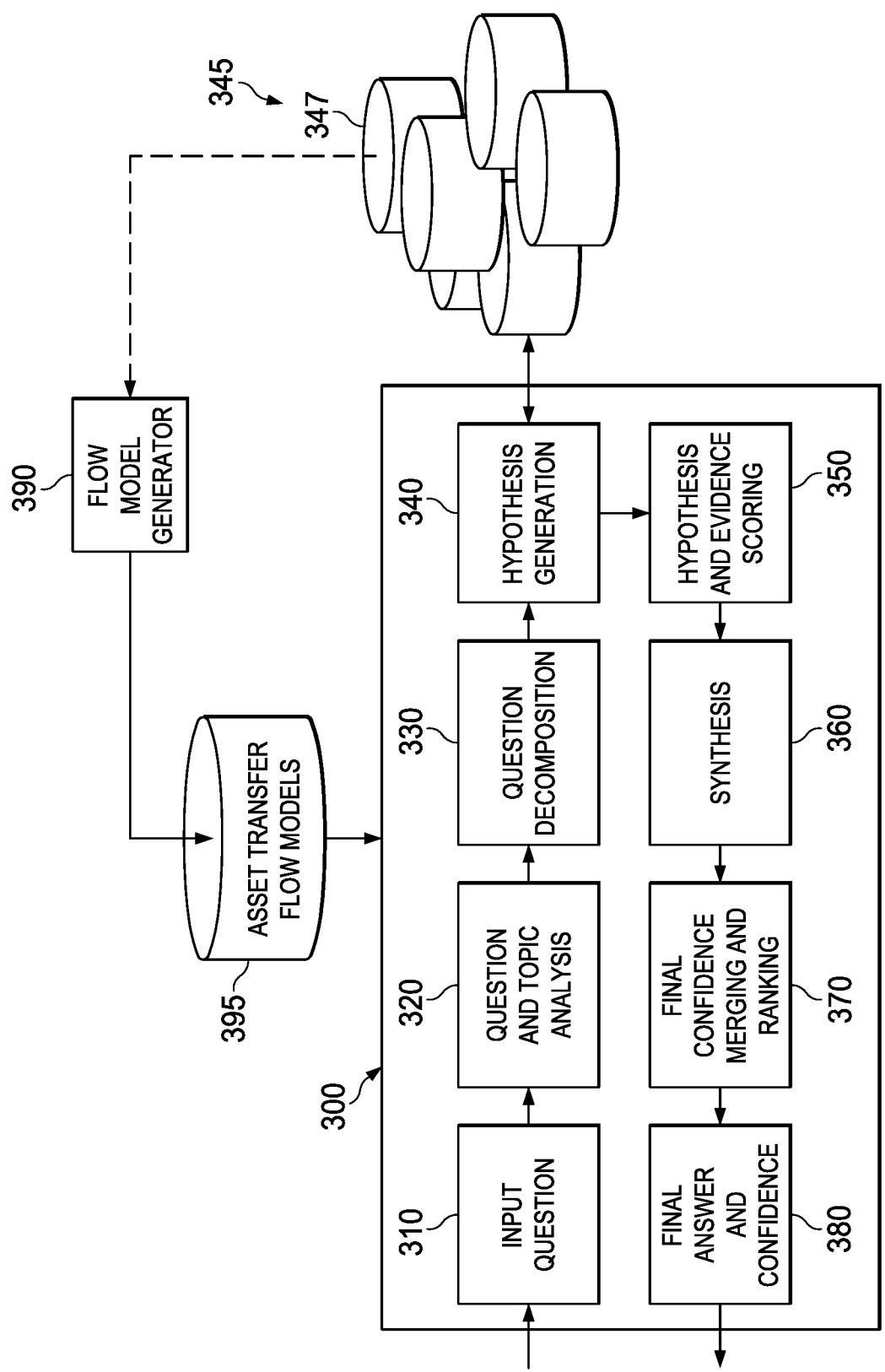
FIG. 3 illustrates a QA system pipeline for processing an input question in accordance with one illustrative embodiment.

FIGS. 1-3 are directed to describing an example QA system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to processing input questions to generate queries applied to a corpus of documents and processing the candidate answer results thereby generated. The QA mechanisms may ingest the flow models generated by aspects of the present invention to thereby provide an additional knowledge base used by the QA mechanisms to identify information sought for answering the input question and identifying the relevance of results generated to the original input question.

Since the mechanisms of the illustrative embodiments improve and augment a QA system, it is important to first have an understanding of how question and answer generation in a QA system may be implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments may be implemented. Many modifications to the example QA system shown in FIGS. 1-3 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, may annotate or otherwise generate metadata for providing information useable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. The illustrative embodiments leverage the work already done by the QA system to reduce the computation time for subsequent processing of questions that are similar to questions already processed by the QA system.

FIG. 1 depicts a schematic diagram of one illustrative embodiment of a question and answer (QA) system 100 in a computer network 102. One example of a question and answer generation which may be used in conjunction with the principles described herein is described in U.S. Patent Application Publication No. 2011/0125734, which is herein incorporated by reference in its entirety. The QA system 100 may be implemented on one or more computing devices 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. The QA system 100 and network 102 may enable question/answer (QA) generation functionality for one or more QA system users via their respective computing devices 110-112. Other embodiments of the QA system 100 may be used with components, systems, sub-systems, and/or devices other than those that are depicted herein.

The QA system 100 may be configured to implement a QA system pipeline 108 that receive inputs from various sources. For example, the QA system 100 may receive input from the network 102, a corpus of electronic documents 106, QA system users, or other data and other possible sources of input. In one embodiment, some or all of the inputs to the QA system 100 may be routed through the network 102. The various computing devices 104 on the network 102 may include access points for content creators and QA system users. Some of the computing devices 104 may include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 may include local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document may include any file, text, article, or source of data for use in the QA system 100. QA system users may access the QA system 100 via a network connection or an Internet connection to the network 102, and may input questions to the QA system 100 that may be answered by the content in the corpus of data 106. In one embodiment, the questions may be formed using natural language. The QA system 100 may interpret the question and provide a response to the QA system user, e.g., QA system user 110, containing one or more answers to the question. In some embodiments, the QA system 100 may provide a response to users in a ranked list of candidate answers.

The QA system 100 implements a QA system pipeline 108 which comprises a plurality of stages for processing an input question, the corpus of data 106, and generating answers for the input question based on the processing of the corpus of data 106. The QA system pipeline 108 will be described in greater detail hereafter with regard to FIG. 3.

In some illustrative embodiments, the QA system 100 may be the Watson™ QA system available from International Business Machines Corporation of Armonk, N.Y., which is augmented with the mechanisms of the illustrative embodiments described hereafter. The Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the Watson™ QA system. The statistical model may then be used to summarize a level of confidence that the Watson™ QA system has regarding the evidence that the potential response, i.e. candidate answer, is inferred by the question. This process may be repeated for each of the candidate answers until the Watson™ QA system identifies candidate answers that surface as being significantly stronger than others and thus, generates a final answer, or ranked set of answers, for the input question. More information about the Watson™ QA system may be obtained, for example, from the IBM Corporation website, IBM Redbooks, and the like. For example, information about the Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 1, in accordance with the mechanisms of the illustrative embodiments, the QA system 100 operates in conjunction with a flow model generator 120 that generates asset transfer flow models (hereafter also referred to generally as "flow models") based on flow relationships extracted from unstructured data, such as is provided in the corpus of data 106, for example. The flow model generator 120 applies natural language processing techniques and logic, including part-whole relationship analysis, semantic role restriction analysis, table data dependency relationship identification analysis, and the like, to identify flow relationships between entities and then combine these flow relationships into an overall asset transfer flow model related to a particular domain, e.g., the flow of a particular type of tangible or intangible object/product/property or legal right from one entity to another. In one illustrative embodiment, this flow is a monetary flow that describes the flow of monetary funds between entities, e.g., payers and payees. The resulting flow models 130 may be provided as a knowledge resource to an analysis system, such as the QA system 100 in FIG. 1, for use in processing input questions and processing resulting candidate answers, as discussed in greater detail hereafter.

It should be appreciated that, while FIG. 1 illustrates the flow model generator 120 being associated with the same server 104 as the QA system 100, this is not required. To the contrary, the flow model generator 120 may be implemented using a different computing device from that used to implement the QA system 100. For example, the flow model generator 120 may be associated with another server 104 coupled to the network 102 and may store the flow models 130 in a network attached storage or other storage mechanism that is accessible by the QA system 100 as a knowledge resource for the QA system 100.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 3 may be augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user may input, via a user interface, an input question for which the user wishes to obtain an answer, e.g., "Who are Washington's closest advisors?" In response to receiving the input question, the next stage of the QA system pipeline 500, i.e. the question and topic analysis stage 320, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

The identified major features may then be used during the question decomposition stage 330 to decompose the question into one or more queries that may be applied to the corpora of data/information 345 in order to generate one or more hypotheses. The queries may be generated in any known or later developed query language, such as the Structure Query Language (SQL), or the like. The queries may be applied to one or more databases storing information about the electronic texts, documents, articles, websites, and the like, that make up the corpora of data/information 345.

That is, these various sources themselves, different collections of sources, and the like, may represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries may be applied to one or more databases storing information about the electronic texts, documents, articles, websites, and the like, that make up the corpus of data/information, e.g., the corpus of data 106 in FIG. 1. The queries being applied to the corpus of data/information at the hypothesis generation stage 340 to generate results identifying potential hypotheses for answering the input question which can be evaluated. That is, the application of the queries results in the extraction of portions of the corpus of data/information matching the criteria of the particular query. These portions of the corpus may then be analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis.

In the synthesis stage 360, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, may be generated and output to the submitter of the original input question.

In accordance with the illustrative embodiments, flow models 395 for representing asset transfer flows between entities, generated by the flow model generator 390 based on NLP processing of the corpora 345, or at least one corpus 347 within the corpora 345, are provided as input to the QA system pipeline 300. The flow models 395 may be provided in different forms depending on the particular implementation. For example, the flow models 395 may be provided in the form of a directed acyclic graph in which entities are provided as nodes and edges have attributes specifying the direction of flow and the object/property/rights that are flowed from one entity to another as well as other information about the particular asset transfer flow. In another illustrative embodiment, the flow models 395 may be provided as a set of rules specifying the flows from one entity to another. Other implementations may utilize other types of representations of the flow models 395 without departing from the spirit and scope of the present invention.

The flow models 395 may be utilized, for example by the question decomposition stage 330 of the QA system pipeline 300 to generate queries to be applied to the corpus 347 or corpora 345. The flow models 395 may further be utilized by the hypothesis and evidence scoring stage 350 when evaluating the candidate answers returned by the hypothesis generation stage 340 to identify the particular flows in the candidate answers and how they relate to the original input question.

For example, the flow model generator 390 operates on documents in a corpus 347 of the corpora 345 to identify flows of particular types described in the documents of the corpus 347. The particular types may be specified a priori by a flow model generator 390 with logic, patterns of terms, syntax structures, dictionaries of terms, etc., for a particular domain, that are indicative of a flow of interest. The flow model generator 390 may identify such patterns through manual, semi-automatic, or automatic pattern identification/extraction as previously discussed above. For example, phrases such as "pays to," "imposes," "licenses to," "licenses from," or any other relational term or phrase may constitute a pattern indicative of a flow, in this case a monetary flow, from one entity to another. These patterns may be identified in the unstructured data of the documents in the corpus 347, which in the examples herein is assumed to be a financial corpus 347, and the various statements in the documents matching these patterns may be further analyzed to identify part-whole relationships, semantic role restrictions, or other flow relationships, as previously discussed above. Moreover, mechanisms similar to those already described above for performing part-whole relationships and semantic role restrictions, and table data dependency relationship extraction may be used to accomplish the identification of such flow relationships in the content of the documents.

The various statements and content of the documents specifying flow relationships may be analyzed to identify the actual connections and flows within a flow model. The statements and content from numerous documents may need to be combined to identify a flow from one entity to another. For example, multiple documents may all provide an indication that drivers pay fees for parking. One of those documents may specify that the parking fees are paid to a municipality. Thus, by combining these statements from various documents, the mechanisms of the illustrative embodiments may deduce that the various parking fees specified in the various documents are paid to the municipality and thus, a flow of parking fees from drivers to the municipality is discovered and a corresponding portion of the flow model is generated, e.g., rules specifying the flow from one entity to another, a 3-argument tuple, or other representation of an asset transfer flow of a directed acyclic graph or the like. Additional flows may be used to add to the flow model, such as other documents specifying spending by the municipality. Thus, the parking fees collected by the municipality, at least in part, may be flowed to the particular projects on which the municipality spends money. This additional flow may be added to the asset transfer flow model 395 to extend the asset transfer flow model 395. This process may be repeated with each additional flow identified through the processing of the corpus 347 until no further flows are identified.

With each flow identified in the corpus 347, a determination may be made as to whether that flow already exists in the asset transfer flow model 395 or not before adding the flow to the asset transfer flow model 395. That is, if the flow already exists, i.e. the same object/product/property/right is already modeled as flowing in the same direction between the same two entities, then the flow is not added to the flow model. However, if any of these elements of the flow are not already present, e.g., the flow is in an opposite direction between the entities, or a different object/product/property/right is the subject of the flow, then the flow may be added to the asset transfer flow model 395.

Once the asset transfer flow model 395 is generated, such as by using the multiple step process previously described above, the asset transfer flow model 395 may be ingested by the QA system for use in assisting with identifying queries to be applied to the corpora 345 or a corpus 347 within the corpora 345. For example during initial question and topic analysis 320, the domain of the input question 310 may be identified to identify a particular corpus 347 corresponding to that domain. In addition, the domain may be used to identify which asset transfer flow model 395, if any, should be used to assist in the question decomposition 330 and hypothesis and evidence scoring 350 and/or final answer and confidence 380 stages. Thus, for example, if the domain of the input question 310 is determined to be an airline financial domain, then a corresponding asset transfer flow model for airlines may be retrieved from the asset transfer flow models 395 and a corresponding corpus 347 associated with airlines may be identified as the target of the queries generated by the QA system pipeline 300.

Based on the question and topic analysis 320, elements of the input question 310 may be identified, such as the Lexical Answer Type (LAT), focus, Question Class, Question Segment, and the like. This information may be combined with information from the asset transfer flow model 395 to identify particular queries that are to be applied to the corpus 347. That is, the information extracted from the input question itself may identify the particular type of information requested, and the asset transfer flow model may identify the particular entities, e.g., payer/payee (elements X and Y in the 3-argument tuple described above) to look for in the documents of the corpus 347 in combination with the particular information requested by the question. For example, if the question were "Who is affected by American Airlines bankruptcy?" the analysis of this question would indicate that the question is looking for names of entities that are associated with American Airlines in a financial manner. Moreover, by looking at the flow model for an airline monetary flow, the QA system may identify that American Airlines is a payer to employees, aircraft manufacturers, government organizations, airports, and the like. Thus, queries regarding employees of American Airlines, aircraft manufacturers of American Airlines, airports associated with American Airlines, etc. may be generated and applied against the corpus 347 to determine the candidate answers for the input question 310.

Once the candidate answers are returned to the QA system pipeline 300, they may be evaluated against the asset transfer flow model 395 to identify the form and content of the candidate answer(s) to be presented to the submitter of the original input question 310. For example, from the asset transfer flow model, the entities involved may be identified, the particular flows from one entity to another may be identified, and this information may be correlated with the information found in the corpus 347 and returned as candidate answers to thereby generate an asset transfer flow-centric answer to the input question 310. That is, the final answer returned to the submitter of the input question 310 may indicate the asset transfer flows that illustrate the reasoning for the result. For example, if a user wishes to know why their property taxes have increased, then the QA system, without the asset transfer flow models 395 may simply reply with an answer of increased expenditures by the municipality. The asset transfer flow models 395 allow the QA system to perform more fine grained analysis and identify that there is a flow of property taxes to the municipality and that the property taxes are utilized by the municipality to fund public school projects, and that the city in which the submitter is located has added a new high school project that is funded by the city. As a result, the answer to the input question 310 may be more specific and pertinent to the submitter's question by returning more than simply "increased expenditures by the municipality" and instead identify that the municipality has a new high school project, that this high school project is funded with property tax income, and thus, the submitter's property tax has most likely increased due to the need for additional property tax income to fund the new high school project.

To provide a further illustration of the manner by which the mechanisms of the illustrative embodiments operate, consider the examples of unstructured data depicted in FIGS. 4A-E which illustrate various documents that may be part of a corpus whose domain is the airline industry. FIG. 4A is a table of airline shares of enplaned passengers for Chicago O'Hare International Airport. FIG. 4B is a portion of a document describing O'Hare International Airport. FIG. 4C is a table of historical operating results for Chicago O'Hare International Airport from 2004-2008. FIG. 4D is a portion of a document describing bonds associated with the city of Chicago. FIG. 4E is a portion of a document describing the flow of funds associated with Chicago O'Hare International Airport. These various documents are examples of unstructured data that may be part of a corpus 347 of a corpora 345.

From this collection of unstructured data, through processing by the flow model generator 390, the following asset transfer flow relations may be extracted by applying part-whole relationship identification logic, semantic role restriction logic, table data dependency relationship identification logic, and the like:

O'Hare receives income from United Airlines

O'Hare receives income from [other airlines in the list]

2010 Third Lien Bonds are funded with operating revenue from O'Hare

2010F Third Lien Bonds are payable from PFC Capital Fund

Bond payments are owed to Bond Holders

2010 Third Lien Bonds are subordinate to the City's PFC Obligations

Additional documents in the ingested corpus 347, such as news reports, may also be analyzed to discover relations such as the facts stated above, i.e. that the City of Chicago collects parking fees from commuters (parking fees are a part of the City of Chicago operating revenue). Semantic role restrictions that may be identified include COMMUTERS pay PARKING FEES to the City of CHICAGO and AIRLINES pay GATE FEES to AIRPORTS.

Figure 5A:
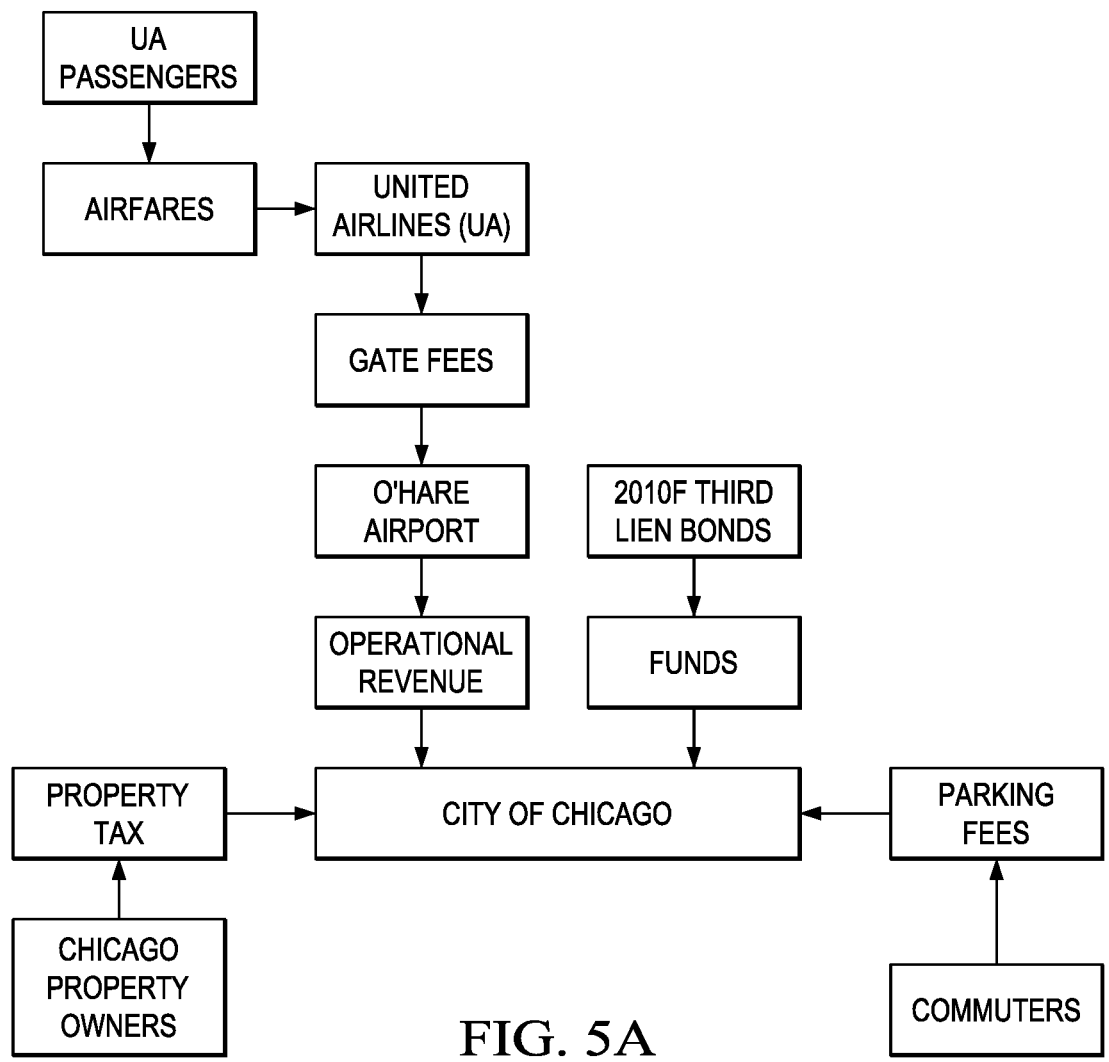
FIG. 5A illustrates an example of an asset transfer flow model for a specific airline and municipality in accordance with one illustrative embodiment.
Figure 5B:
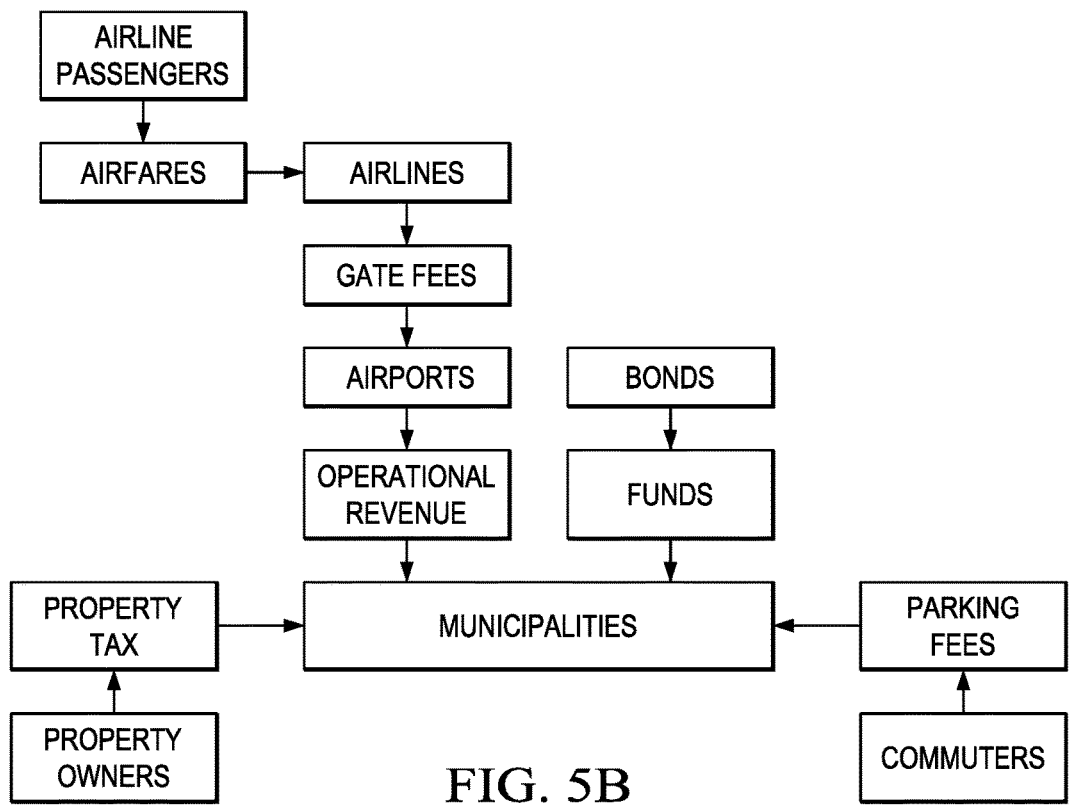
FIG. 5B illustrates an example of a generalized asset transfer flow model corresponding to the asset transfer flow model of FIG. 5A in accordance with one illustrative embodiment.

These relations, and other relations, identified in the documentation shown in FIGS. 4A-4E, and other documents in the corpus, may be used to create an asset transfer flow model that illustrates the flow of funds between entities. FIGS. 5A and 5B illustrate graphical representations of an asset transfer flow model that may be generated based on flow relationships extracted from a corpus of documents, such as the documents 4A-4E. FIG. 5A illustrates the part-whole relationships identified through analysis of the documents in FIGS. 4A-4E. FIG. 5B illustrates the generalization of the part-whole relationships through application of semantic role restrictions and the like to the asset transfer flow model shown in FIG. 5A to obtain a generalized asset transfer flow model.

As shown in FIG. 5A, the asset transfer flow model shows the flow of airfares from United Airlines (UA) passengers to United Airlines which pays gate fees to O'Hare International Airport. O'Hare International Airport's operational revenue is associated with the City of Chicago which has funds that include 2010F Third Lien Bonds. The City of Chicago also obtains property taxes from Chicago property owners and parking fees from commuters. Thus, the monetary flows associated with these entities is modeled using the asset transfer flow model shown in FIG. 5A, which in this case is a directed acyclic graph with each flow being represented as a 3-argument tuple such as (X, Y, Z) where X is the origin entity for the asset transfer, Y is the destination entity for the asset transfer, and Z is the asset transfer type, e.g., gate fees, parking fees, toll, tax, assignment of right, or the like. However, this asset transfer flow model may be generalized for applicability to other entities of similar types, rather than being limited to specifically United Airlines, O'Hare International Airport, and the City of Chicago.

As shown in FIG. 5B, the asset transfer flow model may be generalized while keeping the semantic role restrictions regarding the entities and directions of flow of the objects/products/property or legal rights. In the particular depicted example, the generalization is to generalize from United Airlines to airlines in general, from O'Hare International Airport to airports in general, the City of Chicago to municipalities in general, and from 2010F Third Lien Bonds to bonds in general. As a result, a generalized asset transfer flow model is generated which is applicable to a larger scope of similar asset transfer flows for other airlines, other airports, other municipalities, and other types of bonds, or any combination of the above. This generalized asset transfer flow model, along with the original asset transfer flow model in FIG. 5A, may be ingested as a knowledge resource for the analysis engine utilizing the flow models as a basis for performing their operations, e.g., answering input questions via a QA system.

For example, using the asset transfer flow model of FIG. 5B, when reasoning about the financial health of an entity, one reasons about the parts that comprise its revenue and expense streams and their expected increase/decrease in future time periods. In the depicted example, payers of gate fees are always airlines. This allows a credit analysis reasoning engine, for example, to reason backwards from a query about the financial health of the issuer of a municipal bond, such as the O'Hare Regional Airport Authority, as follows:

1. O'Hare Regional Airport Authority collects revenue from gate fees paid by airlines.

2. Airlines collect revenue from ticket sales to passengers, cargo fares, etc.

3. Source of support for passengers: general economic indicators determine whether personal and business travel is up or down.

When a question answering pipeline is posed a question such as "Why is O'Hare airport's revenue dropping?" in addition to searching for evidence related to O'Hare's revenue, the QA system may also decompose the question into a set of related queries on the revenue of other airlines to provide money inflow to O'Hare airport. To search for documents describing United Airlines' revenue situation, the QA system may draw on its discovered selectional restrictions, or semantic role restrictions, describing asset transfer flow for airlines, such as the fact that passengers purchase tickets from airlines, or business travelers purchase upgrades from airlines. These facts are used to score the relevance of returned passages, so that the system can make use of evidence that is not stated in the same terms as the original question's phrasing, i.e. it is not restricted to finding passages with the terms "revenue" and "United Airlines" for example.

Thus, the mechanisms of the illustrative embodiments provide the ability to generate an asset transfer flow model for a flow of tangible/intangible objects/good/property and/or legal rights and then use that asset transfer flow model to assist with the processing of content to generate desired results by analysis engines. In particular, in some illustrative embodiments, the mechanisms improve the operation of a QA system by using asset transfer flow models to assist with the analysis of input questions to generate search queries and the analysis of results to generate relevance measures and formulate the ultimate response to an input question.

It should be appreciated, as discussed previously, that while the illustrative embodiments are described in the context of monetary flows, the illustrative embodiments are not limited to such. Rather, the flows may be with regard to any tangible or intangible object/good/property and/or legal right. Such tangible/intangible objects, goods, properties, or legal rights generally have the following properties:

1. They are divisible into components such that natural language sentences may mention either individual components or aggregates of components.

2. They are described as being transferred from one entity to another.

3. They are aggregated by the recipient and may be mentioned in terms of either the components or the aggregate categories.

Examples of such tangible/intangible objects, goods, properties, or legal rights include pieces-parts being assembled into a larger component in a manufacturing setting, copyrights, patents, or other intellectual property rights being distributed, assigned, or retained by particular parties, financial transactions organized into accounts, intra-company transfers of inventory/funds, or the like.

Figure 6:
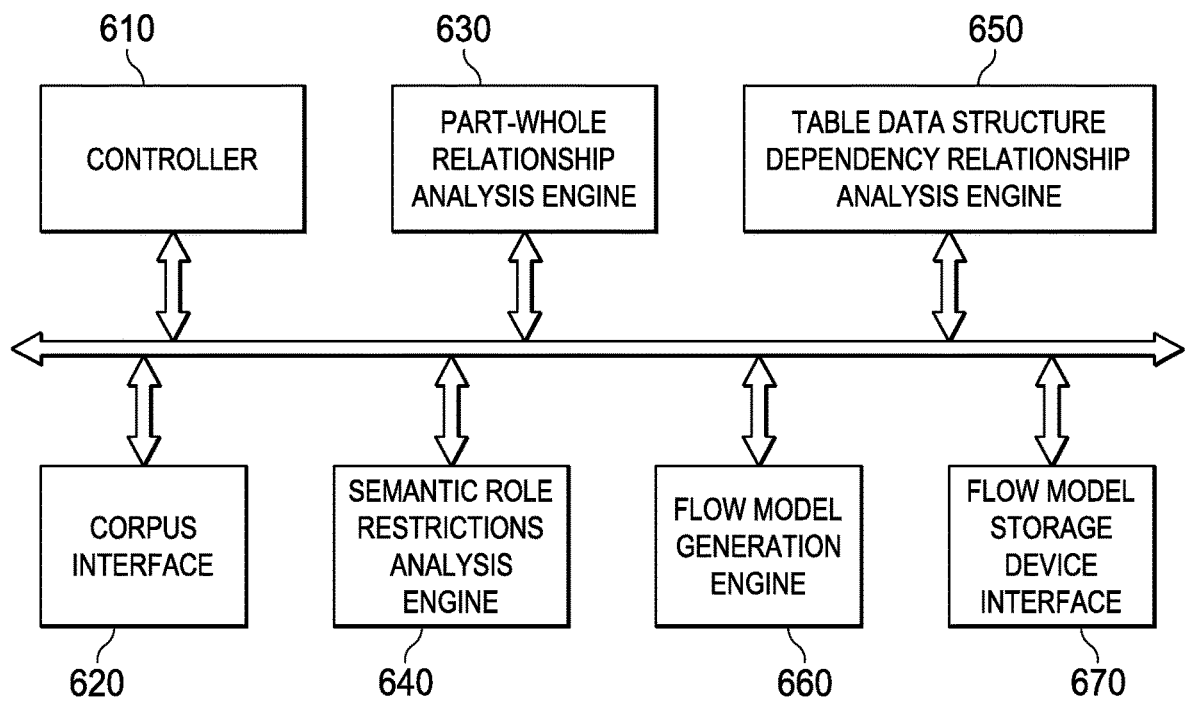
FIG. 6 is an example block diagram of a flow model generator in accordance with one illustrative embodiment.

FIG. 6 is an example block diagram of a flow model generator in accordance with one illustrative embodiment. The elements shown in FIG. 6 may be implemented as software executed by one or more processors, hardware logic, or any combination of software and hardware based logic. In one illustrative embodiment, the elements of FIG. 6 are implemented as software instructions executed by one or more processors of one or more data processing devices.

As shown in FIG. 6, the flow model generator 600 comprises a controller 610, a corpus interface 620, a part-whole relationship analysis engine 630, a semantic role restrictions analysis engine 640, a table data structure dependency relationship analysis engine 650, a flow model generation engine 660, and a flow model storage device interface 670. The controller 610 controls the overall operation of the flow model generator 600 and orchestrates the operation of the other elements 620-670. The corpus interface 620 provides a data communication pathway through which one or more corpora may be accessed for processing to identify flow relationships in accordance with the previously described embodiments.

The part-whole relationship analysis engine 630 applies natural language processing techniques for identifying part-whole relationships in unstructured data to identify part-whole relationships in the one or more corpora obtained via the corpus interface 620. The semantic role restrictions analysis engine 640 applies natural language processing techniques for identifying semantic role restrictions in the one or more corpora obtained via the corpus interface 620. The table data structure dependency relationship analysis engine 650 implements logic for extracting dependency relationships between elements of table data structures in the one or more corpora obtained via the corpus interface 620. The information extracted from the one or more corpora using the logic elements 630-650 are analyzed and combined to generate an asset transfer flow model by the flow model generation engine 660. The generated asset transfer flow models are then stored in a flow model storage device via the flow model storage device interface 670.

Figure 7:
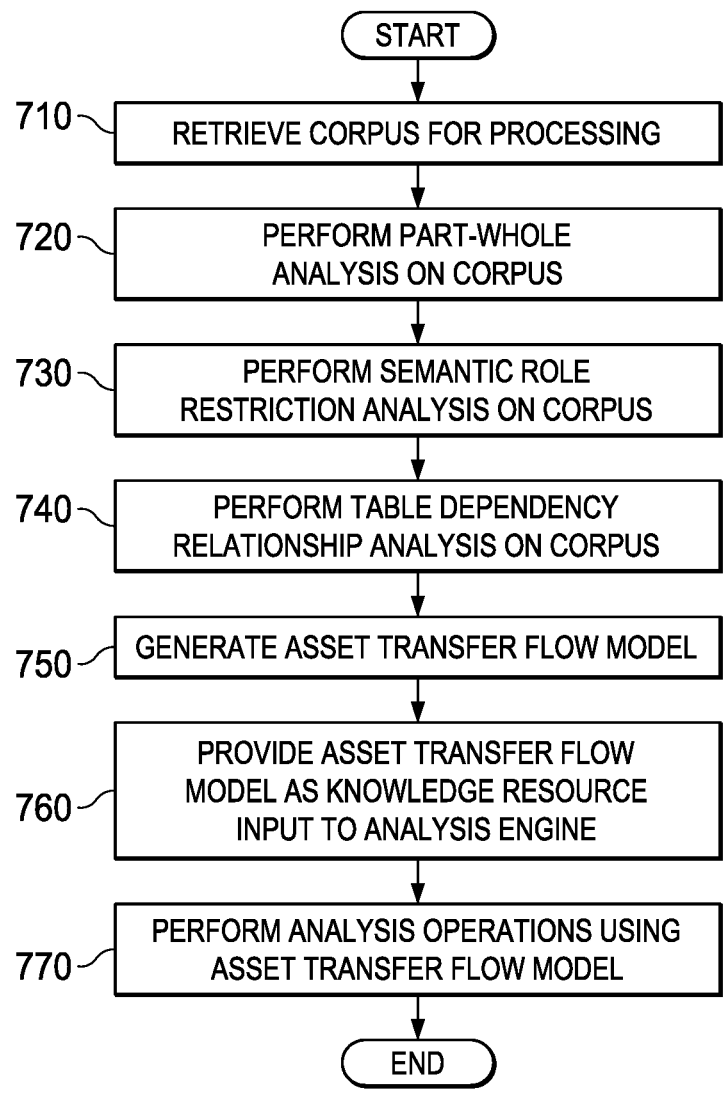
FIG. 7 is a flowchart outlining an example operation for generating and using an asset transfer flow model in accordance with one illustrative embodiment.

FIG. 7 is a flowchart outlining an example operation for generating and using an asset transfer flow model in accordance with one illustrative embodiment. As shown in FIG. 7, the operation starts by retrieving a corpus of documents for processing (step 710). The corpus of documents is processed by part-whole relationship analysis logic to identify part-whole relationships specified in documents of the corpus (step 720). The corpus of documents is further processed by semantic role restriction analysis logic to identify semantic role restrictions specified in the documents of the corpus (step 730). Any table data structures in the corpus are further analyzed to extract dependency relationships identified in the table data structures (step 740). The extracted relationship information and semantic role restrictions are combined to generate an asset transfer flow model which is stored in a flow model storage device (step 750). The asset transfer flow model is input to a natural language processing (NLP) analysis engine, such as a QA system, to be used as a knowledge resource to perform the NLP analysis of content (step 760). The NLP analysis engine performs its operations using the asset transfer flow model knowledge resource (step 770) and the operation terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for performing an analysis of content based on a flow of property between entities, comprising:

performing, by the data processing system, analysis of a corpus of unstructured electronic documents to identify one or more asset transfer flow relationships between entities in unstructured natural language content of the unstructured electronic documents, wherein asset flow relationships indicate a flow of an asset from a first entity to at least one second entity and a type of flow of the asset from the first entity to the at least one second entity;

generating, by the data processing system, an asset transfer flow model defining a flow of an asset between entities based on the one or more asset transfer flow relationships between entities;

inputting, by the data processing system, the asset transfer flow model into an analysis engine for use in analyzing electronic content;

analyzing, by the analysis engine, the electronic content using the asset transfer flow model to generate results of the analysis; and outputting, by the analysis engine, the results of the analysis based on the asset transfer flow model.

2. The method of claim 1, wherein the asset is one of monetary funds or a legal right.

3. The method of claim 1, wherein the analysis engine is a Question and Answer system, and wherein analyzing the content using the asset transfer flow model comprises:

receiving an input question from a source system;

analyzing the input question using the asset transfer flow model to identify one or more queries to be applied to a corpus of documents; and generating one or more candidate answers to the input question based on the one or more queries applied to the corpus of documents.

4. The method of claim 1, wherein the analysis engine is a Question and Answer (QA) system, and wherein analyzing the content using the asset transfer flow model comprises at least one of generating, in a question decomposition stage of a QA system pipeline of the QA system, queries to be applied to the corpus based on the asset transfer flow model or evaluating, in a hypothesis and evidence scoring stage of the QA system pipeline, candidate answers returned by a hypothesis generation stage of the QA system pipeline.

5. The method of claim 1, wherein the asset transfer flow model comprises, for each asset transfer flow relationship between entities, a tuple comprising at least three arguments, and wherein the at least three arguments comprise a first argument specifying an origin entity for the asset transfer flow relationship, a second argument specifying a destination entity for the asset transfer flow relationship, and a third argument specifying an asset transfer type.

6. The method of claim 1, wherein the asset transfer flow model is a directed acyclic graph where nodes of the directed acyclic graph represent entities and edges in the directed acyclic graph represent a transfer of an asset from a source entity to a destination entity.

7. The method of claim 1, wherein performing analysis of the corpus of unstructured documents to identify one or more asset transfer flow relationships between entities comprises performing at least one of part-whole relationship analysis or analysis of functional dependencies in tabular data on at least one unstructured document in the corpus.

8. The method of claim 1, wherein generating an asset transfer flow model defining a flow of an asset between entities based on the one or more asset transfer flow relationships between entities comprises:

generating containment relations and semantic role restrictions from the one or more asset transfer flow relationships; and generalizing the containment relations and semantic role restrictions to not be tied to specific entities, thereby generating relational rules of the asset transfer flow model.

9. A computer program product comprising a computer readable storage medium having a computer readable program stored therein, wherein the computer readable program, when executed on a data processing system, causes the data processing system to:

perform analysis of a corpus of unstructured electronic documents to identify one or more asset transfer flow relationships between entities in unstructured natural language content of the unstructured electronic documents, wherein asset flow relationships indicate a flow of an asset from a first entity to at least one second entity and a type of flow of the asset from the first entity to the at least one second entity;

generate an asset transfer flow model defining a flow of an asset between entities based on the one or more asset transfer flow relationships between entities;

input the asset transfer flow model into an analysis engine for use in analyzing electronic content;

analyze, by the analysis engine, the electronic content using the asset transfer flow model to generate results of the analysis; and output, by the analysis engine, the results of the analysis based on the asset transfer flow model.

10. The computer program product of claim 9, wherein the asset is one of monetary funds or a legal right.

11. The computer program product of claim 9, wherein the analysis engine is a Question and Answer system, and wherein the computer program product further causes the data processing system to analyze the content using the asset transfer flow model at least by:

receiving an input question from a source system;

analyzing the input question using the asset transfer flow model to identify one or more queries to be applied to a corpus of documents; and generating one or more candidate answers to the input question based on the one or more queries applied to the corpus of documents.

12. The computer program product of claim 9, wherein the analysis engine is a Question and Answer (QA) system, and wherein the computer program product further causes the data processing system to analyze the content using the asset transfer flow model by at least one of generating, in a question decomposition stage of a QA system pipeline of the QA system, queries to be applied to the corpus based on the asset transfer flow model or evaluating, in a hypothesis and evidence scoring stage of the QA system pipeline, candidate answers returned by a hypothesis generation stage of the QA system pipeline.

13. The computer program product of claim 9, wherein the asset transfer flow model comprises, for each asset transfer flow relationship between entities, a tuple comprising at least three arguments, and wherein the at least three arguments comprise a first argument specifying an origin entity for the asset transfer flow relationship, a second argument specifying a destination entity for the asset transfer flow relationship, and a third argument specifying an asset transfer type.

14. The computer program product of claim 9, wherein the asset transfer flow model is a directed acyclic graph where nodes of the directed acyclic graph represent entities and edges in the directed acyclic graph represent a transfer of an asset from a source entity to a destination entity.

15. The computer program product of claim 9, wherein the computer program product further causes the data processing system to perform analysis of the corpus of unstructured documents to identify one or more asset transfer flow relationships between entities at least by performing at least one of part-whole relationship analysis or analysis of functional dependencies in tabular data on at least one unstructured document in the corpus.

16. The computer program product of claim 9, wherein the computer program product further causes the data processing system to generate an asset transfer flow model defining a flow of an asset between entities based on the one or more asset transfer flow relationships between entities at least by:

generating containment relations and semantic role restrictions from the one or more asset transfer flow relationships; and generalizing the containment relations and semantic role restrictions to not be tied to specific entities, thereby generating relational rules of the asset transfer flow model.

17. An apparatus comprising:

a processor; and a memory coupled to the processor, wherein the memory comprises instructions which, when executed by the processor, cause the processor to:

perform analysis of a corpus of unstructured electronic documents to identify one or more asset transfer flow relationships between entities in unstructured natural language content of the unstructured electronic documents, wherein asset flow relationships indicate a flow of an asset from a first entity to at least one second entity and a type of flow of the asset from the first entity to the at least one second entity;

generate an asset transfer flow model defining a flow of an asset between entities based on the one or more asset transfer flow relationships between entities;

input the asset transfer flow model into an analysis engine for use in analyzing electronic content;

analyze, by the analysis engine, the electronic content using the asset transfer flow model to generate results of the analysis; and output, by the analysis engine, the results of the analysis based on the asset transfer flow model.

18. The apparatus of claim 17, wherein the analysis engine is a Question and Answer system, and wherein the instructions further cause the processor to analyze the content using the asset transfer flow model at least by:

receiving an input question from a source system;

analyzing the input question using the asset transfer flow model to identify one or more queries to be applied to a corpus of documents; and generating one or more candidate answers to the input question based on the one or more queries applied to the corpus of documents.

19. The apparatus of claim 17, wherein the asset transfer flow model comprises, for each asset transfer flow relationship between entities, a tuple comprising at least three arguments, and wherein the at least three arguments comprise a first argument specifying an origin entity for the asset transfer flow relationship, a second argument specifying a destination entity for the asset transfer flow relationship, and a third argument specifying an asset transfer type.

20. The apparatus of claim 17, wherein the instructions further cause the processor to perform analysis of the corpus of unstructured documents to identify one or more asset transfer flow relationships between entities at least by performing at least one of part-whole relationship analysis or analysis of functional dependencies in tabular data on at least one unstructured document in the corpus.

* * * * *